Jan. 20, 1970  H. RISSE  3,491,280
ELECTRONIC CIRCUIT FOR DRIVING TIME LOCKING DEVICE
Filed Nov. 5, 1968

INVENTOR:
HANS RISSE

By McGlew and Toren
Attorneys

United States Patent Office 3,491,280
Patented Jan. 20, 1970

3,491,280
ELECTRONIC CIRCUIT FOR DRIVING TIME
LOCKING DEVICE
Hans Risse, Schwenningen am Neckar, Germany, assignor to Kienzle Uhrenfabriken GmbH, Schwenningen am Neckar, Germany
Filed Nov. 5, 1968, Ser. No. 773,566
Claims priority, application Germany, Nov. 10, 1967, 1,673,767
Int. Cl. H02p 1/16
U.S. Cl. 318—128                                   6 Claims

ABSTRACT OF THE DISCLOSURE

An electronic circuit for driving a time locking device with a mechanical oscillatory system includes a driving coil arranged in the emitter-collector circuit of a transistor and a control circuit arranged in the base-emitter circuit of the transistor. These coils are so located that there is no inductive coupling therebetween, and they cooperate with permanent magnets of the mechanical oscillatory system. A condenser and an inductance are connected in series with each other between the base and the collector of the transistor, and a preferably adjustable resistance is connected between the base and collector.

BACKGROUND OF THE PRIOR ART

For the purpose of improving the effectiveness of the driving impulse of an electronic circuit for driving a time locking electrical device with a mechanical oscillatory system, it is known to couple inductively control and driving coils. The coupling is connected in the form of a positive feedback, as shown, for example, in German Patent No. 1,073,967. By virtue of relative motion between a permanent magnet and the control coil, a short-period control impulse is released, and has a magnitude such that it exceeds the threshold value of the transistor and thereby effects an electric feedback to provide in the operating coil, an intensified square-wave pulse or an envelope curve impulse of several wave trains. A prerequisite for the functioning of this circuit, however, is that the input and output are coupled with one another through the control and operating coils.

In this arrangement, the coupling of the two coils can be chosen to be so close that, even without control impulses, the electronic circuit oscillates at a high frequency. To suppress these high frequency oscillations outside the zero passage, or reversal point, of the mechanical oscillatory system, an electrically conductive screen is used to interrupt the high frequency oscillations by means of eddy currents. Such an arrangement is shown, for example, in Swiss Patent No. 10,121/62. A circuit of this design provides for self-starting of the mechanical oscillatory system, so that special mechanical starting devices are not needed.

However, the use of high frequency oscillations as driving impulses reduce the electro-mechanical output, so that generally it has been attempted to work at least with envelope curve impulses. For this purpose, it is known to connect, between the collector and base of the transistor, a negative feedback condenser which offers only a slight resistance to the high frequency oscillations. In this case, the self-starting circuit includes a condenser connected between the base and emitter, and a preferably adjustable resistance connected between the base and collector. The condenser is then charged periodically through the resistance until, at the base of the transistor, the threshold value of the transistor is exceeded. Thus, the transistor will conduct for a brief period. The frequency of the RC combination in chosen to be lower than that of the mechanical oscillatory system so that the latter, by means of the induction in the control coil, can trigger the electronic circuit. In this case, also, it is necessary that at least a loose coupling exists between the control coil and the operating coil.

There are, however, many oscillator arrangements wherein it is not possible to inductively couple the control and operating coils with each other. The control and operating coils are then physically separated from each other and associated with different magnetic circuits of the mechanical oscillatory system. Such a circuit can then work only as a pure repeater circuit, i.e., the operating impulse has essentially the form of the control impulse. It is not possible to obtain, with this arrangement, a steepness of the flanks of the curve of the driving impulse, such as is possible with an envelope curve impulse of several wave trains. Thus, a square-wave impulse cannot be attained.

SUMMARY OF THE INVENTION

This invention relates to electronic circuits for driving time locking electrical devices having a mechanical oscillatory system and, more particularly, to an improved electronic driving circuit free of the drawbacks of the prior art and including control and operating coils which are not inductively coupled with each other.

In accordance with the invention, the electronic circuit includes, between the base and the collector of the transistor and in series with the known condenser, an inductance. This inductance should preferably be greater than 2.5 $\mu$h., and the capacity of the condenser preferably should be greater than 5 $\mu$f. This circuit is especially effective in conjunction with self-starting circuit wherein, between the base and emitter, there is connected a condenser and, between the base and collector, there is connected a preferably adjustable resistance.

An object of the invention is to provide an improved electronic circuit for driving a time locking electrical device with a mechanical oscillatory system.

Another object of the invention is to provide such an electronic circuit including control and driving coils which are not inductively coupled with each other.

A further object of the invention is to provide such an electronic circuit including an inductance and a condenser connected in series between the base and collector of a transistor.

Another object of the invention is to provide such an electronic circuit including a self-starting circuit including a condenser connected between the transistor base and emitter and a preferably adjustable resistance connected between the transmitter base and collector.

A further object of the invention is to provide such an electronic circuit particularly useful in instances where it is not possible to inductively couple the control and operating coils with each other.

For an understanding of the principles of the invention, reference is made to the following description of a typical embodiment thereof as illustrated in the accompanying drawings.

DESCRIPTION OF THE PREFERRED EMBODIMENT

Figure 1:
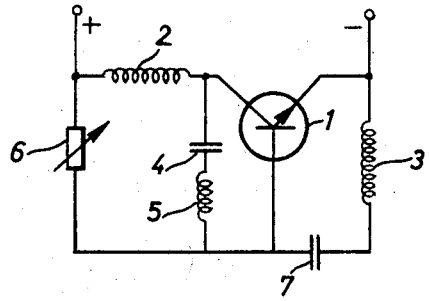
FIG. 1 is a schematic diagram of the electronic circuit of the invention.

Referring to FIG. 1, a transistor 1 has an emitter, a base and a collector, and a source of electric potential is connected to the emitter and to the collector. An operating coil or winding 2 is connected in the emitter-collector circuit of transistor 1, and a control coil 3 is connected in the base-emitter circuit of transistor 1. For the self-starting of the circuit, there is provided a resistance 6 and a condenser 7, and the frequency of this RC combination is chosen to be slightly lower than that of the mechanical oscillatory system.

Figure 2:
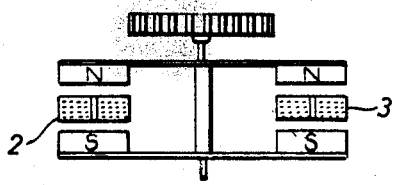
FIG. 2 is an elevation view, partly in section, of the mechanical oscillatory system driven by the electronic circuit of FIG. 1.

As best seen in FIG. 2, permanent magnets are operatively associated with the coils 2 and 3, and are movable relative thereto. There is no inductive coupling between operating coil 2 and control coil 3. In order that rectangular driving impulses occur in coil 2 despite the fact that coils 2 and 3 are not inductively coupled, an LC member is connected between the base and collector of transistor 1, and consists of condenser 4 and inductance 5. The values of inductance 5 and condenser or capacitor 4 should, in this case, be greater than the values mentioned above. The resulting rectangular envelope curve pulse envelops and RF voltage of the order of magnitude of 10 MHz.

Figure 3:
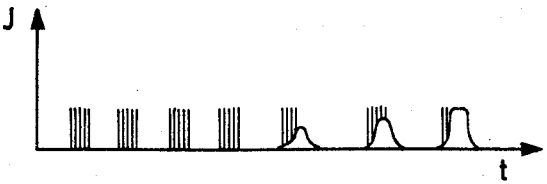
FIG. 3 is a graphical illustration of the impulse forms at the starting of the oscillating system.

FIG. 3 illustrates the pulse forms at the starting of the oscillatory system. These pulses represent the flow of current through operating coil 2. The chronological interval and the duration of the high frequency pulses is determined by the RC combination 6–7. The frequency of the pulses is determined by the LC combination 4–5. By means of these pulses, the mechanical oscillatory system is started. Through the induced voltage developed as a consequence of the movement of the permanent magnets over control coil 3, there flows, through operating coil 2 during normal operation, a current which is amplified by transistor 1.

What is claimed is:

1. An electronic circuit, for driving a time locking device having a mechanical oscillatory system, comprising, in combination, a transistor having a base, an emitter and a collector; a source of potential connected across said emitter and said collector; a driving coil in the emitter-collector circuit; a control coil in the base-emitter circuit; said coils being located out of inductively coupled relation with each other; said mechanical oscillatory system including permanent magnet means magnetically cooperable with said coils and mounted for movement relative thereto; and a condenser and an inductance connected in series with each other between said base and said collector.

2. An electronic circuit, for driving a time locking device having a mechanical oscillatory system, as claimed in claim 1, in which said inductance has a value greater than 2.5 $\mu h$. and said condenser has a capacity value greater than 5 $\mu f$.

3. An electronic circuit, for driving a time locking device having a mechanical oscillatory system, as claimed in claim 1, comprising a self-starting circuit including a condenser connected between said base and said emitter and a resistance connected between said base and said collector.

4. An electronic circuit, for driving a time locking device having a mechanical oscillatory system, as claimed in claim 3, in which said resistance is adjustable.

5. An electronic circuit, for driving a time locking device having a mechanical oscillatory system, as claimed in claim 3, in which said last-named condenser is connected in series with said control coil.

6. An electronic circuit, for driving a time locking device having a mechanical oscillatory system, as claimed in claim 3, in which said resistance is connected in parallel with said series combination of a condenser and an inductance.

References Cited

UNITED STATES PATENTS

| | | | |
|---|---|---|---|
| 2,909,732 | 10/1959 | Van Overbeck | 331—116 |
| 3,124,731 | 3/1964 | Eysen et al. | 318—132 |
| 3,156,857 | 11/1964 | Herr et al. | 318—132 |
| 3,349,305 | 10/1967 | Dietsch | 318—132 X |
| 3,359,473 | 12/1967 | Negri | 318—132 X |

MILTON O. HIRSHFIELD, Primary Examiner

D. F. DUGGAN, Assistant Examiner

U.S. Cl. X.R.

58—23; 318—130; 331—116